(12) United States Patent
Day

(10) Patent No.: US 9,807,950 B2
(45) Date of Patent: Nov. 7, 2017

(54) INTERLOCKING RAFT FOR DEEPWATER CULTURE HYDROPONICS

(71) Applicant: Suncrest USA, Inc., Seattle, WA (US)

(72) Inventor: James P. Day, Seattle, WA (US)

(73) Assignee: SUNCREST, USA, INC., Seattle, WA (US)

( * ) Notice: Subject to any disclaimer, the term of this patent is extended or adjusted under 35 U.S.C. 154(b) by 137 days.

(21) Appl. No.: 14/706,644

(22) Filed: May 7, 2015

(65) Prior Publication Data

US 2016/0135396 A1 May 19, 2016

Related U.S. Application Data

(63) Continuation of application No. PCT/US2014/066377, filed on Nov. 19, 2014.

(51) Int. Cl.
*A01G 31/02* (2006.01)
*B63B 35/44* (2006.01)

(52) U.S. Cl.
CPC ...... *A01G 31/02* (2013.01); *B63B 2035/4493* (2013.01); *Y02P 60/216* (2015.11)

(58) Field of Classification Search
CPC ...... A01G 31/00; A01G 31/001; A01G 31/02; A01G 31/06; A01G 9/104
USPC ......... 47/62 R, 59 R, 64, 62 N, 63, 48.5, 86, 47/66.1, 66.3, 66.5, 66.6, 66.7, 65, 60
See application file for complete search history.

(56) References Cited

U.S. PATENT DOCUMENTS

| | | |
|---|---|---|
| 2,175,113 A | 10/1939 | Fischer |
| 2,531,562 A | 11/1950 | Eve |
| 2,807,912 A | 10/1957 | Bjorksten |
| 3,456,385 A | 7/1969 | Plath |
| 3,513,593 A | 5/1970 | Beck |
| 3,579,907 A | 5/1971 | Graves |
| 3,667,159 A | 6/1972 | Todd |

(Continued)

FOREIGN PATENT DOCUMENTS

| | | |
|---|---|---|
| DE | 1949462 A1 | 4/1971 |
| DE | 2037013 A1 | 2/1972 |

(Continued)

OTHER PUBLICATIONS

International Search Report and Written Opinion for PCT/US2014/066377.

*Primary Examiner* — Trinh Nguyen

(74) *Attorney, Agent, or Firm* — D. Benjamin Borson; Borson Law Group, PC

(57) ABSTRACT

Embodiments of a hydroponic growing system include raft segments that can be reversibly attached together to form a raft. Rafts can have one or more plant holes to support a plant body, and one or more thermal chimneys to provide for gas transport from underneath the raft to the upper surface, to control temperature and humidity of the plant. Additional embodiments include wireless sensors that may or may not be part of a raft, and a growing environment control system that can receive data from one or more sensors of environmental conditions of a plant and in other embodiments, can detect discrepancies between the actual environmental conditions and desired conditions. In still further embodiments, a growing environment control system can automatically adjust an actuator to return an environmental condition to a desired state.

13 Claims, 10 Drawing Sheets

(56) References Cited

U.S. PATENT DOCUMENTS

| | | | |
|---|---|---|---|
| 3,798,836 A | 3/1974 | Rubens | |
| 3,810,329 A | 5/1974 | Lecuru | |
| 3,830,013 A | 8/1974 | Lesley | |
| 3,927,491 A | 12/1975 | Farnsworth | |
| 4,037,360 A | 7/1977 | Farnsworth | |
| 4,058,931 A * | 11/1977 | Vestergaard | A01G 9/104 47/64 |
| 4,299,054 A | 11/1981 | Ware | |
| 4,312,152 A * | 1/1982 | Drury | A01G 31/02 47/62 R |
| 4,355,484 A | 10/1982 | Mandish | |
| 4,382,348 A | 5/1983 | Kitsu | |
| 4,513,533 A | 4/1985 | Gething | |
| 4,607,454 A | 8/1986 | Koike | |
| 4,926,584 A * | 5/1990 | Horibata | A01G 31/02 47/59 R |
| 5,261,185 A * | 11/1993 | Koide | A01G 31/02 47/63 |
| 5,287,652 A | 2/1994 | Delp | |
| 6,843,021 B1 * | 1/2005 | Huang | A01G 9/00 47/60 |
| 7,448,163 B2 * | 11/2008 | Beeman | A01G 9/00 47/60 |
| 8,250,808 B2 * | 8/2012 | Kania | A01G 31/00 47/59 S |
| 8,327,579 B2 * | 12/2012 | Kania | A01G 31/00 47/59 R |
| 8,443,749 B2 * | 5/2013 | Kania | B29B 17/0042 114/264 |
| 2003/0070357 A1 * | 4/2003 | Huang | A01G 9/00 47/66.3 |
| 2009/0223128 A1 | 9/2009 | Kuschak | |
| 2012/0054061 A1 | 3/2012 | Fok | |

FOREIGN PATENT DOCUMENTS

| | | |
|---|---|---|
| GB | 1031309 A | 6/1966 |
| GB | 1053508 A | 1/1967 |
| GB | 1318736 | 4/1971 |
| GB | 1313121 A | 4/1973 |
| WO | WO2009066991 | 5/2009 |

* cited by examiner

600

800

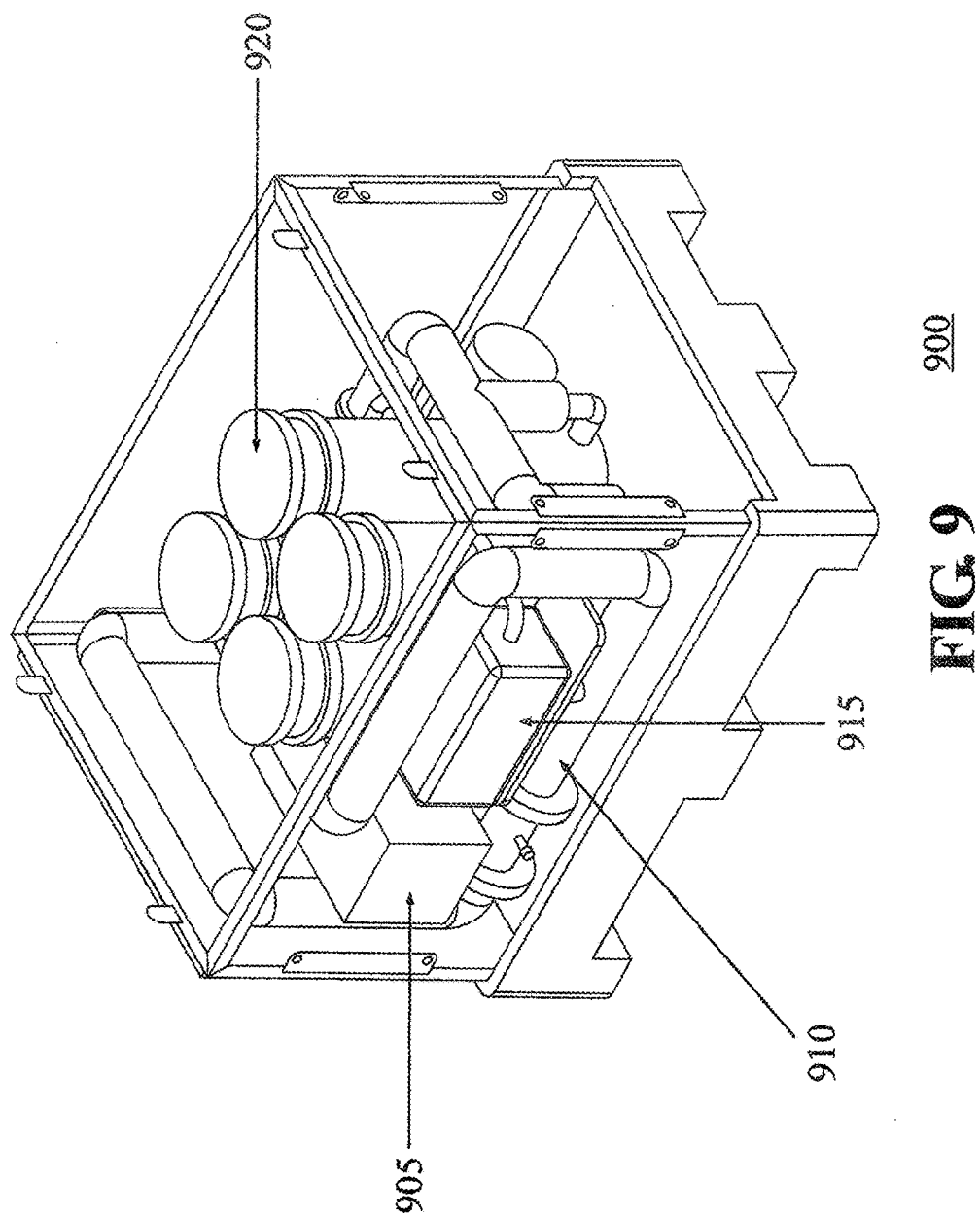

INTERLOCKING RAFT FOR DEEPWATER CULTURE HYDROPONICS

CLAIM OF PRIORITY

This application is a United States Non-Provisional Patent Application filed, under 35 U.S.C. 111(a) claiming priority to International Patent Application No. PCT/US2014/066377 filed 12 Nov. 2014, entitled "Interlocking Raft for Deepwater Culture Hydroponics," Inventor James P. Day, which claims priority to U.S. Provisional Patent Application No. 62/040,311 filed 21 Aug. 2014 entitled: "Interlocking Raft for Deepwater Culture Hydroponics, James P. Day, Inventor. Each of these applications is incorporated herein fully by reference.

FIELD OF THE INVENTION

This invention relates to hydroponic systems for growing plants. In particular, this invention relates to systems and improved rafts for deepwater culture hydroponics.

BACKGROUND

As human populations increase, agricultural production is increasingly being limited by arable land, and access to sufficient water to irrigate crops for human consumption. In many countries, limitations of arable land and water have contributed to disputes over borders, water rights, and distribution of food.

One approach to addressing problems of food production, food security and distribution is the use of hydroponic growing systems, in which soil is not needed. Floating raft systems have been used in Deep Water Culture (DWC) hydroponic growing systems (also known as floating raft systems) for many years, and as a result, hydroponics is being used in many countries and has led to more reliable food production.

SUMMARY

I have identified a new problem in the field, namely that existing raft systems for hydroponics suffer from undesired algal growth on rafts, and inconsistent and variable temperature control of growing conditions. I have also identified another problem in the field, namely that in existing systems algal growth in the water competes for both nutrients and oxygen which subsequently creates deficiencies that promote root rot and increase particulate matter in the pond. Another problem in the field is that existing greenhouses, under hot conditions are prone to overheating the air with subsequent loss of crop.

To address these and other problems, I have devised a new type of floating raft system. The new system comprises a series of individual raft portions, that can be attached to each other to form a larger raft. In some embodiments, each raft portion can have a series of interlocking connections, whereby two or more rafts can be held in place by "tab & tab blank" interlocking connections to form a larger raft structure with little or no gaps between them. In other embodiments, raft portions can be held together using wires, staples, or ties. In some aspects, such rafts can be designed and manufactured to completely cover the top surface of a DWC tank (or "pond"). This feature can substantially decrease the ability of light to penetrate into the pond, and with the decreased light available, algal growth can be substantially decreased. Decreasing algal growth reduces the loss of nutrients and dissolved oxygen from the pond water, which in turn, can be used by the cultured plants.

Other aspects of this invention include a novel raft design comprising holes for the plants to be grown, and also includes other holes (or "thermal chimneys") that are designed to improve thermal transfer between the pond and air layer just above the pond for the growing plants. In hot growing conditions, where the temperature of the plant body could be undesirably high, the thermal chimneys can be points of transfer of cool gas bubbles from the pond, upwards and to the plant bodies, thereby maintaining the atmosphere surrounding the plant body at a desirable temperature and humidity to the growing plants, and can increase efficiency and decrease total growing time.

In some aspects, a combination of a large, relatively continuous raft and the presence of thermal chimneys in areas of the plant holes can advantageously direct the gas bubbles in the pond to the thermal chimneys and thence to the plant bodies. It can be desirable for the raft to cover at least a significant portion of the surface of the pond. In such situations, the gas bubbles have only limited avenues for escape to the atmosphere, and if the gas bubbles are contained beneath the raft, it is more likely that they will exit the pond via the thermal chimneys. In some aspects, a raft system can nearly completely cover the pond surface, thereby increasing the transfer of gas from the pond to the atmosphere surrounding the plant bodies.

One advantage of the systems of this invention is that the temperature of the roots are better optimized at or near 68° F., which allows the plant leaves to sustain a higher temperature. Use of the systems and methods of this invention can use significantly less water and land than conventional systems. Also, hydroponic growing systems, when combined with controlled-environment greenhouses, can provide high-efficient production that "local" greenhouse growers can now provide year round produce production in high-volume in most climates.

In cold climates, it may be necessary to heat the air within a greenhouse to 65-70° F., which is more expensive than heating the water. With water warmed to 68° F., the thermal chimneys can then channel the relatively warm gas from the pond to the growing plant bodies and therefore maintain them at a more suitable temperature. Therefore, aspects of this invention permit more ideal temperature regulation at reduced cost, decrease loss of plants, and thereby increase yield.

Aspects

The aspects disclosed herein are for illustration only, and are not intended to limit the scope of the inventions. Rather, persons of skill can adapt the aspects by combining them together, in whole or in part without departing from the scope of the invention.

A first aspect includes a raft segment for deepwater hydroponic culture, comprising:

a sheet of buoyant material having a plurality of first holes therethrough, each of said holes adapted to retain a plant body with said plant's roots suspended in a tank or pond of water; and one or more second holes through said sheet adapted to transmit gas from said tank or pond to the atmosphere; and one or more tabs sized to intercalate with tab blanks of an adjacent raft segment.

Another aspect includes the raft segment of the first aspect, said sheet having a bottom side, said bottom side having a recessed portion encompassing said plurality of first and said second holes.

A further aspect includes the raft segment of either aspect above, said sheet having a top side having an elevated portion encompassing one or more of said plurality of first and said second holes.

A yet further aspect includes the raft segment of any preceding aspect, said tabs and blanks being rounded.

A still further aspect includes the raft segment of any preceding aspect, said buoyant material comprising an open cell polymer foam or a closed cell polymer foam.

Another aspect includes the raft segment of any preceding aspect, wherein said foam polymer is selected from the group consisting of polystyrene ("PS"), expanded polystyrene ("EPS"), copolymers of polystyrene, composites of polystyrene, and bioplastics.

A yet further aspect includes the raft segment of any preceding aspect, wherein at least one of said plurality of plant holes has a diameter at the top surface greater than the diameter at the bottom surface.

A still further aspect includes the raft segment of any preceding aspect, where said second hole has a diameter at the bottom surface greater than the diameter at the top surface.

Another aspect includes a raft segment for deepwater hydroponics comprising:
  a sheet of buoyant material having a plurality of first holes therethrough, each of said holes sized to retain a plant body with said plant's roots suspended in a pond, where said sheet has one or more attachment devices suitably configured to reversibly attach said raft segment to another raft segment.

A further aspect includes the raft segment of any preceding aspect, where said attachment devices comprise tabs on an edge of said sheet, said one or more tabs suitably sized to fit into a corresponding tab blank on an adjacent sheet.

Still further aspects include the raft segment of any preceding aspects, where said attachment devices are selected from the group consisting of staples, wires, ties, hooks and eyes, and Velcro®.

Additional aspects include the raft segment of any preceding aspect, further comprising one or more end caps having at least one tab or tab blank suitably sized to reversibly engage with said raft segment.

Yet further aspects include the raft segment of any preceding aspect, where one side of said segment is without tabs or blanks.

Additional aspects include a raft for hydroponics comprising:
  a plurality of raft segments reversibly fastened together, each raft segment having one or more plant holes therethrough and
  one or more thermal chimneys therethrough.

Further aspects include the raft segment of any preceding aspect further comprising one or more sensors attached to the top or bottom side of said raft segment.

Other aspects include the raft segment of any preceding aspect, further comprising a sensor selected from the group consisting of a temperature sensor, an oxygen sensor, a carbon dioxide sensor, an electrical conductivity sensor, a particulate sensor, pathogen sensor, nutrient ion sensor, and a pH sensor.

Yet other aspects include the raft segment of any preceding aspect, further comprising one or more sensors comprising at least one nano sensor and a wireless transmitter.

Additional aspects include the raft segment of any preceding aspect, further comprising a transmitter having a unique internet protocol (IP) address such that the raft can be identified and located.

Still further aspects include the raft segment of any preceding aspect, further comprising a database containing information received from one or more sensors on said raft segment.

Further aspects include a system for hydroponics, comprising:
  one or more raft segments held together to form a raft;
  said raft having a plurality of plant holes and a plurality of thermal chimneys;
  one or more environmental sensors to measure an environmental variable of the environment of said raft; and
  a platform control system to:
    store or transmit to a remote location information captured by said one or more environmental sensors;
    compare said information with previously stored benchmark data; and
    identify discrepancies between said information and said benchmark data; and
    transmit one or more signals to a solenoid, an actuator, or other controlling device to adjust the environment to bring it into benchmark tolerances.

Additional aspects include the system of any preceding aspect, said one or more sensors being attached to said raft segment.

Further aspects include the system of any preceding aspect, further comprising a control module.

Still further aspects include a method for hydroponic culture, comprising the steps:
  providing one or more raft segments of any preceding aspect;
  placing one or more plant plugs in one or more of said plant holes;
  placing said raft segments on the surface of a pond containing water; and
  connecting said raft segments together to form a raft.

Yet further aspects include the method of any preceding aspect, further comprising the steps:
  aerating water in said pond; and
  providing nutrients to said water.

Additional aspects include the method of any preceding aspects, further comprising:
  measuring one or more environmental variable using one or more sensors; and
  if the level of said environmental variable is outside a desired range, using an actuator to adjust the level of said environmental variable to return it to within said desired range.

Yet still further aspects include the method of any preceding aspect, further comprising the steps:
  causing one or more sensors to transmit a measured value of an environmental variable to a remote location having a database containing a desired value of said environmental variable, said remote location having a processor associated with said database;
  causing said processor to compare said measured value of said environmental variable with the desired value of said environmental variable, and
  causing said processor to transmit instructions to said actuator to adjust the value of said environmental variable to within the desired range.

Additional aspects include the method of any preceding aspect, where one or more transmissions uses a wireless communication system.

Yet other aspects include the method of any preceding aspect, where the remote location is the Cloud.

Additional aspects include the raft segment of any preceding aspect, where said plant body is positioned within a basket in said plant hole.

Still further aspects include the raft segment of either of any preceding aspect, further comprising an ion sensor to measure nitrogen, calcium, or potassium.

BRIEF DESCRIPTION OF THE DRAWINGS

This invention is being described with reference to specific embodiments thereof. Additional features and characteristics can be understood with reference to the drawings, in which:

FIG. 9 depict a yet further view of a control module of this invention.

DETAILED DESCRIPTION

Definitions

Figure 1A:
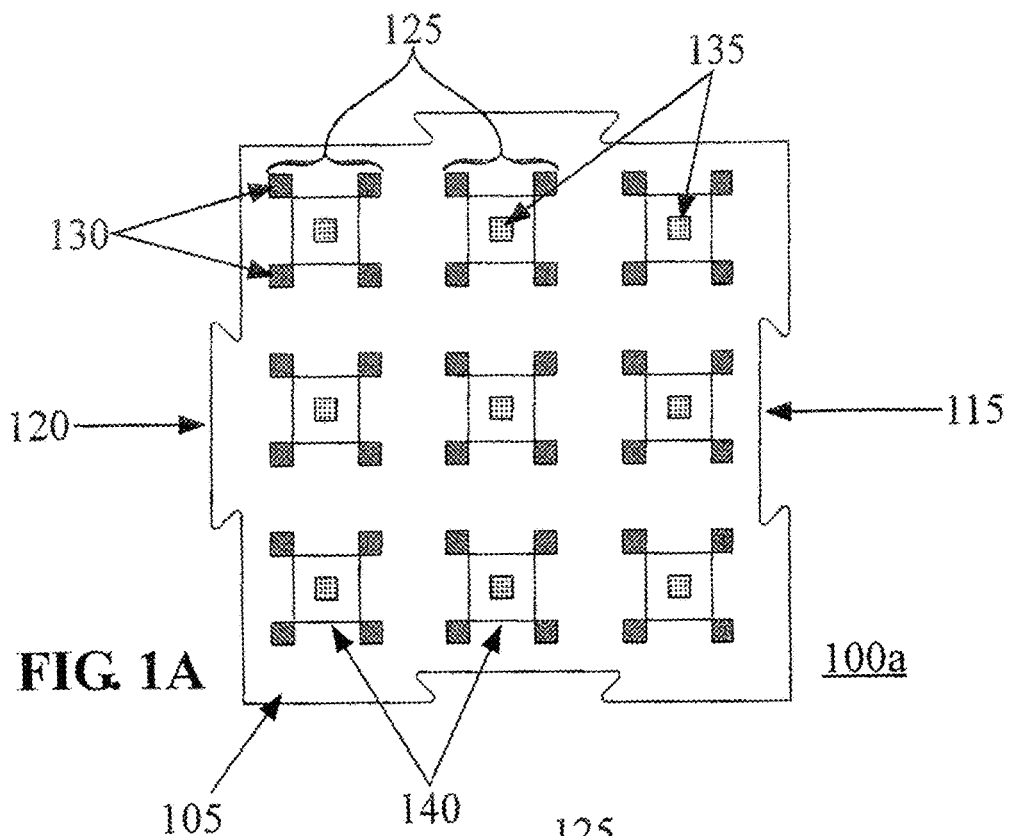
FIG. 1A depicts a top view of a schematic drawing of a raft portion of this invention.

The term "raft segment," "raft section," and "raft portion" means a conveniently sized piece of material that can float upon the water in a pond. When a plurality of raft segments are joined together, they form a "raft."

The term "interlocking float" means a raft segment having "tabs" and "tab blanks" therein, thus permitting adjacent raft segments to be reversibly interlocked together.

The term "plant plug" means a media (e.g. coir, peat, synthetic) that are shaped into plugs that fit into the holes in the raft. Plant seeds may be incorporated into a plant plug. Alternatively, seedlings may be incorporated into a plant plug.

The term "plant hole" means a hole in a raft segment configured to hold a plant body, with the roots of the plant suspended beneath the plant body, and with the leaves of the plant above the plant body.

The terms "second hole," "thermal chimney," "thermal exchange chimney," "chimney," and "thermal hole" means a hole in a raft segment positioned between plant holes. Such thermal chimneys are routes gas bubbles can take to escape from the pond water, rise through the raft segment, and thereby exchange heat between the pond water and the plant leaves.

The term "comprising" means "includes but is not limited to."

The term "consisting of" means "includes and is limited to."

The term "consisting essentially of" means "includes the enumerated elements and their obvious equivalents.

The term "about" means a value plus or minus 20% of the value.

Aspects

Floating rafts for hydroponic growing of plants have typically been made from polystyrene materials which float on water. Round or square holes are spaced on the raft to allow room for mature plants. Various types of media (e.g. coir, peat, synthetic) are shaped into plugs that fit into the holes in the raft. Plant seeds are placed in the plugs and as they grow the roots reach into the water upon which the rafts float.

Existing rafts may be made in several shapes and sizes, but do not include the innovations described herein. One of the most widely used rafts has dimensions of 48"×24"×1" raft (e.g., by BeaverPlastics of Canada). There are several limitations, which are common to other raft shapes currently available. Some of these limitations include:

1. Rafts in Deep Water Culture (DWC) tanks frequently bind along the tank edges, which limits movement from one end of the tank to the other. Mechanical devices are sometimes used in the tank water to keep the rafts aligned with each other. The equipment and its use are not only costly, but introduce metal contamination into the growing environment. To minimize binding in the tanks adequate space must be left between rafts (e.g., generally about ⅛" to 1") between them, a distance that allows light to enter the water, thereby promoting algal contamination, and permitting gas bubbles to escape along the uncovered portions of the pond.

2. Aeration of pond water is important to maintain healthy roots and thereby promote plant growth. However, with aeration, air pressure can build up under the rafts. This can cause the rafts to rise above the surface of the water, which can compromise root health, and can retard growth of the plants in the raft.

3. A thermal differential can be created because of the insulative value of the rafts (e.g., R7). While this can be an advantage in some conditions, it is not currently used to optimize the growth of the maturing plant.

4. Due to the porous and often rough surface of the polystyrene used in today's polystyrene rafts, algae is able to adhere to the rafts, promoting algal growth and making them difficult to clean for reuse.

Embodiments

A. Interlocking Floats

Interlocking floats can be designed like a "puzzle" piece with "tabs" and corresponding tab "blanks" such that the interlocking floats (or "raft segments") can interlock together. They may be manufactured in any size, but a 24-inch square is a good size for DWC hydroponic ponds.

Figure 1B:
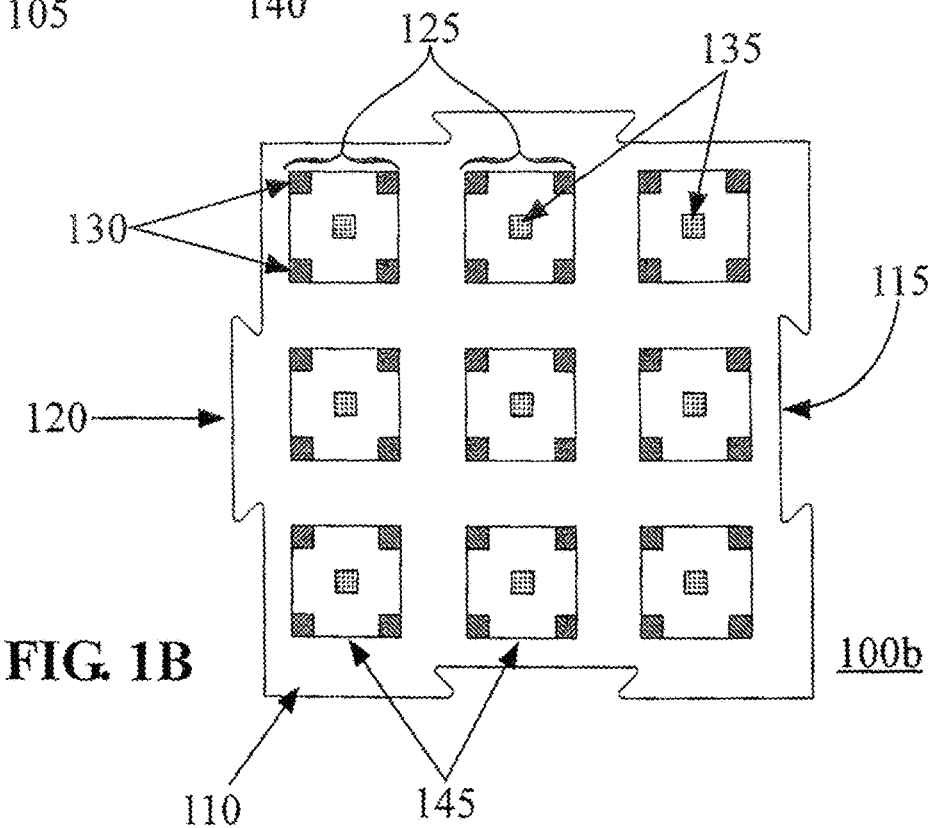
FIG. 1B depicts a bottom view of a schematic drawing of a raft segment of this invention.

Raft segment and tab dimensions are variable and the number of tabs and tab blanks are also variable, but a single large tab or tab blank on each side as depicted in FIGS. 1A and 1B is easy to envision and manufacture. A somewhat loose fit can be provided for easy placement and removal of the raft portions from the pond. FIGS. 1A and 1B depict an embodiment in which there is a single tab and blank on each side. In other embodiments (not shown), there can be 2 tabs and 2 corresponding blanks, 3 tabs and 3 corresponding blanks, or any larger number of tabs and blanks, depending on the size of the rafts, and how securely engaged to each other they are desired to be.

Figure 4:
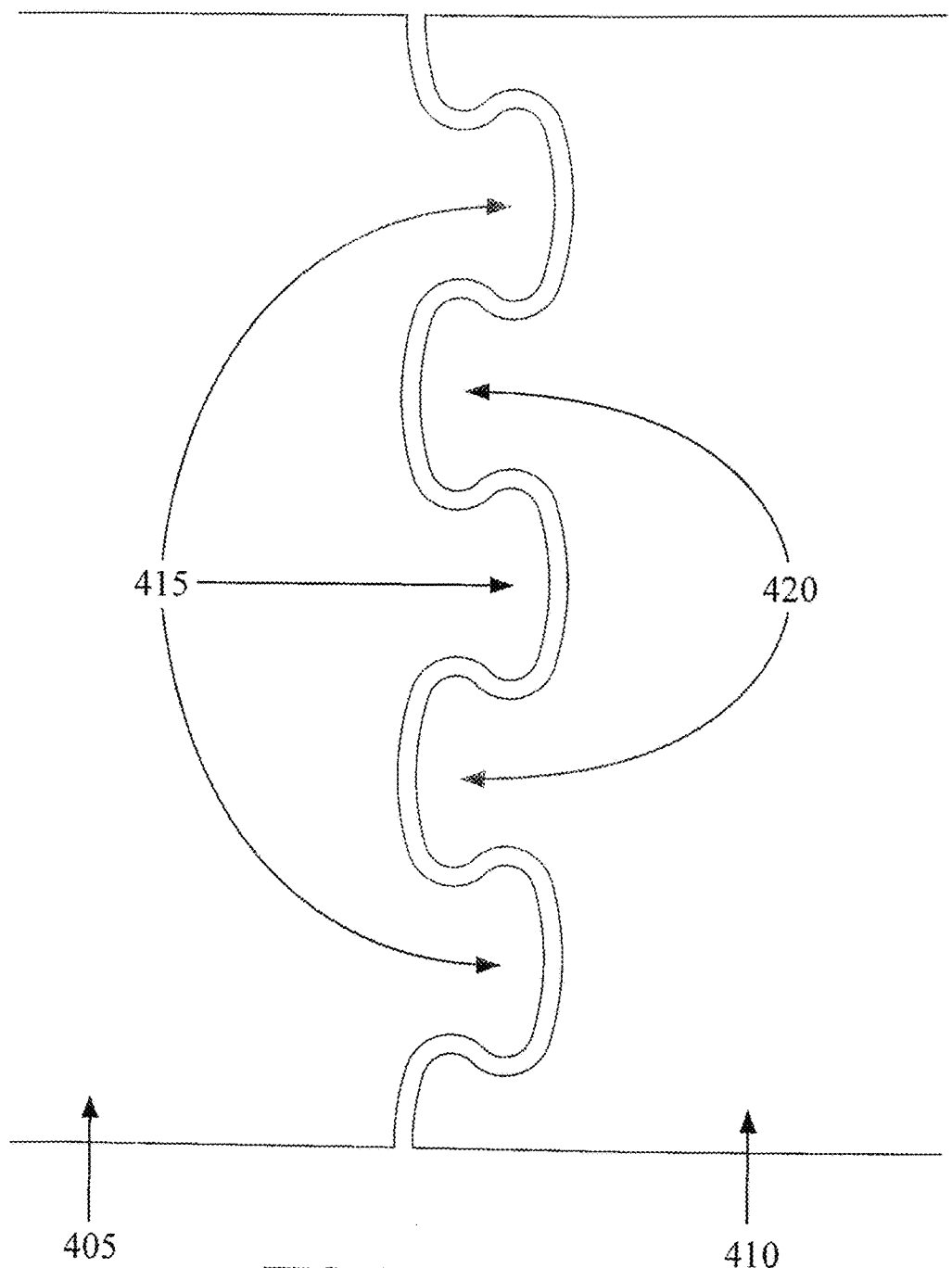
FIG. 4 depicts an alternative structure for engaging raft portions of this invention.

FIG. 4 depicts an alternative engagement mechanism for joining raft portions 405 and 410, respectively. As can be seen, tabs 415 and blanks 420 are curved and designed to intercalate with their respective counterparts on an adjacent raft portion.

Typical raft segment sizes for practical growing can be 8 inches (8") by 8"; 24" by 24"; or 24" by 48." In other embodiments, a practical size can be a 32"×24" because it would hold 12 heads of lettuce which is the number that goes in a box.

The thickness of a raft can also be selected from a variety of options. A raft segment having a thickness of about 1" can be sufficient for many uses, especially for smaller plants, but a thickness of about 2" or about 3" can accommodate larger plant systems with heavier plants, because a thicker raft can support a larger media plug and taller plant vertically.

Other embodiments include raft segments that are not square, but are rectangular. It is easy for a person of skill to envision rectangular engaging rafts based on the ideas expressed in FIGS. 1A and 1B.

In further embodiments, hexagonal raft segments (each having six sides) can be suitably used. It can be appreciated that seven of such six-sided rafts can be engaged with each other to form a continuous platform for DWC uses. It can be appreciated that the overall shape of a raft can be adapted to fit variously shaped ponds.

It can be appreciated that other devices can be used to join raft segments together. For example, wires, cord or plastic ties, plastic staples, Velcro®, snaps, hooks and eyes, and other such can reversibly hold raft segments together.

B. Tapered Holes in Raft Segments Hold Plants

FIG. 1A depicts a raft segment having an opening, indicated as a square for the plant media. Typically these can have a top opening of about 1" square holes tapered to ¾" at the bottom, so the plant plug can be securely positioned and does not slip through the raft and into the water and become lost. It can be appreciated that round holes, frustroconical holes, or other configurations can be used so long as lateral dimension of the top portion of the hole is greater than the lateral dimension of a lower portion of a plant hole.

Figure 5:
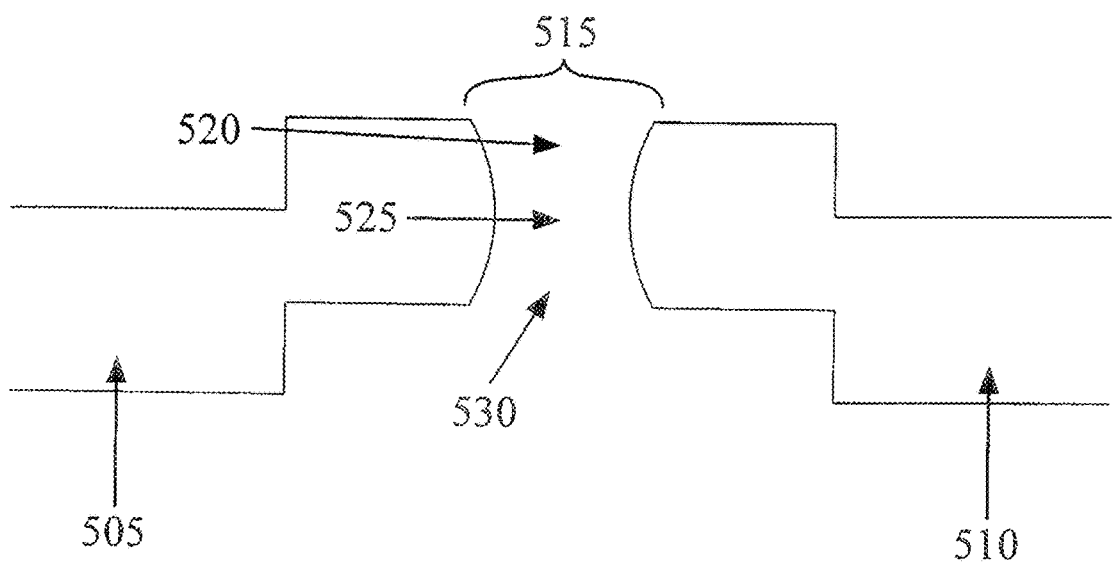
FIG. 5 depicts a side transverse view of a raft of this invention having a "venturi" configured plant hole.

In still further embodiments, as shown in FIG. 5, an embodiment 500 of this invention can have a plant hole with a "venturi" shape, in which a middle portion 525 of the hole has a lateral dimension narrower than the dimensions of either the top 520 or bottom 530 of the hole. Such configurations can provide stabile suspension of the plant in the raft hole, yet permit expansion of both the top of the plant and its roots as the plant grows.

C. Air Traps Under Raft

Black outline squares depicted on the top-side of the raft portion (FIG. 1A) can indicate 2"-3" raised areas of about ¼"-⅜" in height. Black outlines on the bottom or water-side of the raft (FIG. 1B) indicate a larger 4"-6" recession area of about ¼"-⅜" deep into the raft to provide an air trap for aeration bubbles. In use, aeration, or introduction of other gases, provides a series of gas bubbles in the water of the DWC pond, and they rise up to the underside of the raft. By providing a "gas trap," the bubbles can become located under the raft near the plants, and can find easy exit through thermal chimneys in the raft segment and can provide heat transfer from the pond to the plant leaves above. It can be appreciated that in situations in which the temperature of the environment is undesirably cold, heat in the pond water can be transferred by gas bubbles through the raft segment and thereby warm the plant leaves above.

D. Thermal Exchange Chimneys in Floats

Red squares in FIG. 1B indicate "thermal chimneys," or "air holes" in a raft segment that can have various sizes and shapes. In some preferred embodiments, such a thermal chimney can be square and have dimensions of about ¾" on the bottom and ¼" on the top, to allow pressure relief from aeration bubbles coming to the underside of the raft segment, and also to provide thermal exchange between the water in the pond and the atmosphere above the raft segment. However, in some embodiments a thermal chimney can be non-tapered and still provide for gas transport from the underside of the raft segment to the top of the raft segment. Thermal chimneys can be positioned within or outside a raised portion of a raft segment, and may be sized to be wither larger, the same size, or smaller than a plant hole.

In alternative embodiments, thermal chimney can have a circular, oval, or polygonal cross-section. In still further embodiments, a simple tube or "straw" can be inserted through the raft segment to permit gas underneath the raft to pass upwards through the raft to the top of the segment.

Thermal chimneys are shown in FIG. 1B located within the recession area on the bottom of the raft. The recession permits gathering of bubbles around the root base prior to release through the thermal chimney. This thermal chimney operates to provide heat exchange between the pond water and the air just above the raft segment. This heat exchange can reduce air cooling and heating requirements and to maintain optimal growth temperatures for the plant. As the water temperature is typically 65° F.-68° F., the greater the thermal differential with the air layer above the raft segment, the more thermal exchange can occur. It can also be appreciated that maintaining a cooler water temperature can increase the amount of dissolved oxygen in the water.

E. End-Caps for Interlocking Rafts

End-caps fit over the tabs and/or blanks of interlocking raft segments at the end of a row of such raft segments such that the end raft segments of a rafts will have a continuous edge along the walls of a DWC pond. The purpose of end-caps is to further minimize water surface area that is exposed to light to prevent algae growth. As exposed water surface decreases, pressure from aeration bubbles increases making "thermal chimneys" more efficient. End-caps may also be made of polystyrene to interlock along one edge with the rafts. They may capture multiple raft edges along the side of a pond.

Such end-caps can link multiple interlocking raft segments together along the edge of a large group of interlocking raft segments to form a continuous edge along the DWC pond wall. Use of end-caps and interlocking raft segments can minimize the surface area of water being exposed to light, which can reduce algae growth. Also, because the surface area of water is minimized, air pressure from aeration bubbles can increase and force more bubbles through a thermal chimney to provide a thermal layer above the rafts that is similar to the thermal zone below.

Alternatively, the rafts depicted in FIG. 1A and FIG. 1B can be used at either end of a row of rafts, can be manufactured without the blanks 120 and tabs 115 on one side of the raft such that "end-caps" are not needed along the walls of a tank.

F. Raft Materials

Raft segments may be manufactured using any convenient material. In some embodiments, raft segments can be made of polystyrene or other suitable plastic, resin, or bioplastic material, preferably having lower density than water. In other embodiments, raft segments can be made from wood. In still further embodiments, rafts can be made of a material having density near to or greater than that of water, but with a raised "lip" on each edge; such embodiments will float on the water by simple displacement of water (according to the Archimedes principle), and the resulting upward forces exerted by the displaced water provides buoyancy, in a fashion similar to that of a conventional boat.

1. Polystyrene

Polystyrene ("PS") is perhaps the most common material, there are thousand of variations and alternative materials that may be used. Various types of aromatic polymers made from monomer styrene; copolymers such as polybutadiene and expanded polystyrene foam ("EPS") extruded polystyrene foam ("XPS"), polyisocyanurate foam, polyurethane foam or composite honeycomb ("HSC"). Also, bioplastics which are a form of plastic, that come from renewable sources, such as corn, vegetable oil or corn starch, for example.

Polystyrene is a synthetic aromatic polymer made from the monomer styrene, a liquid petrochemical. Polystyrene can be rigid or foamed. General purpose polystyrene is clear, hard and brittle. It is a very inexpensive resin per unit weight. It is a rather poor barrier to oxygen and water vapor, and has a relatively low melting point. Polystyrene is one of the most widely used plastics, the scale of its production being several billion kilograms per year. Polystyrene can be naturally transparent, but can be colored with colorants. Uses include protective packaging (such as packing peanuts and compact discs ("CD") or digital video discs ("DVD" cases), containers (such as "clamshells"), lids, bottles, trays, tumblers, and disposable cutlery. Polystyrene is used to make the highly inflammatory napalm-B, where it makes up about 46% of the formulation.

Polystyrene is in a solid (glassy) state at room temperature but flows if heated above about 100° C., its glass transition temperature. It becomes rigid again when cooled. This temperature behavior is exploited for extrusion, and also for molding and vacuum forming, since it can be cast into molds with fine detail.

Polystyrene is very slow to biodegrade and therefore a focus of controversy, since it is often abundant as a form of litter in the outdoor environment, particularly along shores and waterways especially in its foam form.

In still further embodiments "closed cell foams" can be used. Closed cell foams can be useful in situations in which open cell foams may become water-logged and lose buoyancy. Closed cell foams can provide buoyancy and yet be relatively soft and flexible compared to typical polystyrene foams. Extruded closed-cell polystyrene foam is sold under the trademark Styrofoam® by Dow Chemical Company.

Expanded polystyrene (EPS) is a rigid and tough, closed-cell foam. It is usually white and made of pre-expanded polystyrene beads. EPS is used for disposable trays, plates, bowls and cups; and for carry-out food packaging (including the hinged lid containers popularly known as "clam shells"). Other uses include molded sheets for building insulation and packing material ("peanuts") for cushioning fragile items inside boxes. Sheets are commonly packaged as rigid panels (size 4 by 8 or 2 by 8 feet in the United States), which are also known as "bead-board." In addition to polystyrene foams, other "open cell" foams of plastics can be used.

2. Copolymers

Pure polystyrene is brittle, but hard enough that a fairly high-performance product can be made by giving it some of the properties of a more elastic material, such as polybutadiene rubber. The two such materials can never normally be mixed because of the amplified effect of intermolecular forces on polymer insolubility (see plastic recycling), but if polybutadiene is added during polymerization it can become chemically bonded to the polystyrene, forming a graft copolymer, which helps to incorporate normal polybutadiene into the final mix, resulting in high-impact polystyrene ("HIPS"), often called "high-impact plastic." One commercial name for HIPS is Bextrene®. Common applications of HIPS include toys and product casings. HIPS is usually injection molded in production. Autoclaving polystyrene can compress and harden the material.

Several other copolymers are also used with styrene. Acrylonitrile butadiene styrene ("ABS") plastic is similar to HIPS: a copolymer of acrylonitrile and styrene, toughened with polybutadiene. Electronics cases can be made of this form of polystyrene, as are many sewer pipes. A copolymer of styrene and acrylonitrile ("SAN"), and styrene maleic anhydride ("SMA") can also be used.

Styrene can be copolymerized with other monomers; for example, divinylbenzene can be used for cross-linking the polystyrene chains to give the polymer used in solid-phase peptide synthesis.

3. Oriented Polystyrene

Oriented polystyrene ("OPS") is produced by stretching extruded PS film, improving visibility through the material by reducing haziness and increasing stiffness. This is often used in packaging where the manufacturer would like the consumer to see the enclosed product. Some benefits to OPS are that it is less expensive to produce than other clear plastics such as PP, PET, and HIPS, and it is less hazy than HIPS or PP. The main disadvantage to OPS is that it's brittle. It will crack or tear easily.

4. Composites

Structural insulated panels (or structural insulating panels; "SIPs"), can be made as a composite building material. They comprise an insulating layer of relatively rigid core sandwiched between two layers of structural board. The board can be sheet metal, plywood, cement, magnesium oxide board (MgO) or oriented strand board ("OSB") and the core either expanded polystyrene foam ("EPS"), extruded polystyrene foam ("XPS"), polyisocyanurate foam, polyurethane foam or composite honeycomb ("HSC").

5. Bioplastics

Bioplastics come from renewable sources, such as corn, vegetable oil, or corn starch, for example. They differ from the standard plastics, made from petroleum, that we have come to depend on in society over the past several decades. For example, many clear plastic containers today are made from polylactic acid ("PLA"), a resin produced from corn.

G. Manufacture of Raft Segments

There are a number of manufacturing techniques that can be used to construct raft segments, including extrusion, injection molding, blow molding, vacuum forming, stretching, and molding.

1. Injection Molding

Injection molding (also known as "injection moulding") can be performed with a variety of materials, including metals, glasses, elastomers, confections, and commonly, thermoplastic and thermosetting polymers. There are many commercial suppliers of resins and plastics additives for injection molding.

In other embodiments, one can manufacture honey-comb floating structures with skins to seal out water using injection molding techniques. Similarly, one can use blow molding methods with some of the above materials to make floating rafts.

In some embodiments, an economical system is probably the molded polystyrene method. These rafts can be buoyant, insulatative, and inert to growing plants. Biodegradable foam packaging can be used as an alternative to Styrofoam, and is made from a material derived from sugar cane processing. Numerous injection molding resins on commercially available (Prospector, IDES.com; Innovadex.com).

2. Plastic Blow Molding

Blow molding is a conversion process wherein heat and pressure are applied to pelletized thermoplastic materials that are extruded into a cylindrical tube called a "parison." The molten "parison" is suspended within an aluminum mold closing around it. The mold halves are held together with a large hydraulic press while air is injected into the center of the part, forcing the plastic to push outward and replicate the cavity of the mold. In addition to the actual part cavity, the molds have water lines to assist in cooling and solidifying the part. Typical Materials used in blow molding include polypropylene ("PP"), polyethylene ("PE"), polyethylene terephthalate ("PET"), and polyvinyl chloride ("PVC").

3. Molded Pulp Vs. Expanded Polystyrene

Expanded polystyrene ("EPS") packaging has historically been a popular choice for protecting, products in distribution. However, rising oil prices and a growing trend towards the use of environmentally friendly products has led to an increase in use of molded pulp packaging.

4. Opaque Raft Segments

In certain embodiments, it can be desirable to manufacture a raft segment with a material that is opaque or otherwise decreases transmission of light. Decreasing penetration of light through a raft can decrease the amount of light that reaches the water below the raft, and thereby decreases algal growth in the pond. In some embodiments, it may be desirable to totally exclude light from the pond water. This can be accomplished by: (1) providing sufficient coverage of the pond surface by rafts, and/or (2) providing rafts that are opaque or do not permit light to penetrate into the water.

In some embodiments, one can provide a reflective or mirror-type surface to reflect and diffuse light, or a dark or black surface color to absorb heat. Rafts can have one of these surface coverings on each side. In this way a dark surface might be facing up to absorb heat in the winter, and the reflective side might be facing up to reflect heat in the summer.

H. Growing Environment Control System

In certain embodiments, the growing conditions can be under the control of a "Growing Environment Control System ("Control System"), that can comprise an actuator to adjust the temperature of the water in a pond, temperature of the atmosphere in an enclosed greenhouse, aeration, pH of the water, oxygen content, carbon dioxide content, and fertilizer type and concentration, among other environmental variables. In some embodiments, such control systems can be computer controlled using a Control Module. To provide for efficient and real-time control over growing conditions, such Platform Control Systems can include use of one or more different types of sensors, described below.

I. Sensors

In some embodiments, data can be collected using one or more sensors attached to the underside or top side of a raft segment, thereby creating an "intelligent" raft segment. Such intelligent raft segments can be provided by SmartRaft™, a trademark of Suncrest USA, Inc. In some cases, such sensors can be wireless and can transmit data on conditions of pond water and the atmosphere above a raft segment to a central computer system to monitor in real-time, the growing conditions. The types of information that can be collected include temperature of the pond water and atmosphere above the raft segment, pH, electrical conductivity (EC), dissolved oxygen, carbon dioxide, nutrient ions including nitrogen and potassium, or growth factors including fertilizer types and amounts.

In some of these embodiments, embedded QR codes, or coded wireless signals (e.g. modulation and/or line-coding techniques) from a raft mounted transmitter, on individual raft segments can provide labeling of data to a particular grow cycle and crop so as to uniquely identify the location, date, time, product species identification, planting date, harvest date and other growth cycle identifiers.

A Growing Environment Control System can include a Control Module. An example of a Control Module is shown in FIGS. 6-9. A Control Module may include a frame, electrical receptacle, electronic control panel, inlets and outlets for water and fertigator, filters, and a computer module. Information from sensors can be received by the computer memory, and a computer processor can compare input data with data on desired environmental conditions, If a difference between measured and desired variables are identified, the computer can send signals to one of several actuators either within the Control Module, or outside the Control Module. A Control Module can be portable, and can be delivered to a growing site, installed and connected to sensors. Use of a Control Module is described herein in Example 3 below.

As growing data ("platform data") is transmitted in real-time from one or more SmartRaft™ units in a DWC pond, platform data can be "data matched" to "benchmark data" that has been identified for a desired condition for growth of a particular plant species such as Bibb Lettuce. If the "platform data" (averaged data of SmartRaft™ units in a pond) as compared to "benchmark data," is outside an acceptable range, signals can be transmitted to the platform control systems to adjust the growing conditions above and below the raft segment to bring them into conformity with the benchmark values for the measured variables.

Over time, a catalog of benchmarks or "plant optimization fingerprints" can be developed to provide automated adjustments for controlled environment agriculture in greenhouses using DWC hydroponics. It can be appreciated that automated control systems can be used for other types of hydroponics or even for soil-based growing in greenhouses provided that the proper sensors are used to collect relevant data.

EXAMPLES

Aspects of this invention are described with respect to specific embodiments thereof. Other features of this invention can be appreciated with reference to the examples below. It can be appreciated that the disclosures and teachings of this invention can be varied by a person of skill in the art to produce additional embodiments. All such embodiments are considered part of this invention.

Example 1: Interlocking Raft Float

In some aspects, this invention includes "tab & tab blank" interlocking rafts. FIGS. 1A and 1B depict a schematic diagram 100a of a raft portion having top 105 and bottom view 100b having bottom surface 110. In each view, each raft portion comprises a plurality of areas 125 where the plants are placed in holes 135. Holes 135 are typically sized to accommodate a plug of growth matrix and seeds that produce the plant. As shown in FIGS. 1A and 1B, each raft portion contains 9 such areas 125, each having 1 hole 135 for the plant media. Typically holes 135 are 1" tapered square holes that have a top opening larger than the bottom so the plant plugs (not shown) do not slip through the raft and into the water, where they can be lost in the pond. FIG. 1A also shows the outline of several areas 140 representing raised areas in the raft portion. On the bottom side view 100b, bottom surface 110 of the raft portion includes a number of areas 145 are shown, which represent recession areas under the raft to provide an air trap for aeration bubbles to congregate.

FIGS. 1A and 1B also depict additional openings or "thermal chimneys" 130 in the raft, located around plant holes 135. Each thermal chimney is an opening through the raft portion to provide a passageway for gas to escape from the water in the pond to the atmosphere. As shown, the thermal chimneys can be of variable size and shape, allowing pressure relief from aeration bubbles coming to the underside of the raft portion, as well as providing thermal exchange between the tank water and the air layer just above the raft portion via the air bubbles. Thermal chimneys are depicted in FIG. 1 within the recession area 145 to allow the gathering of bubbles around the root base prior to release through the chimney. In other embodiments, thermal chimneys can be placed laterally to the raised areas of the raft segment. This configuration provides for thermal exchange to warm or cool the air above the raft. As the water temperature is typically 65° F.-68° F., the greater the thermal differential between the water in the pond and the air layer above the raft, the more thermal exchange can occur.

Also shown in FIGS. 1A and 1B, a "tab and blank" or "tongue and groove" type of interlocking system is shown. Blanks 115 and tabs 120 are depicted. Blanks 115 and tabs 120 are sized relative to each other to permit interlocking of two rafts portions together.

Figure 2:
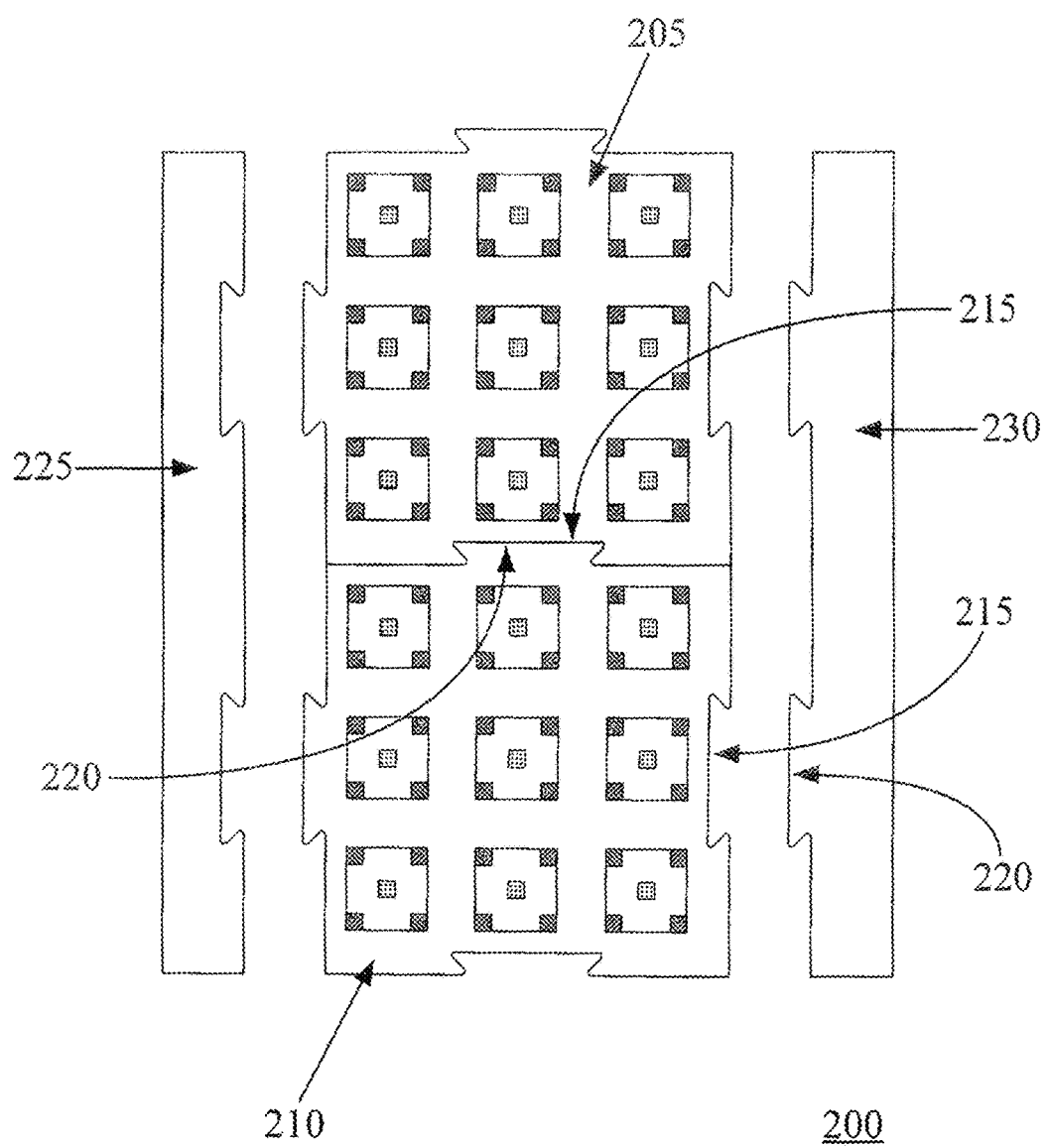
FIG. 2 depicts a schematic drawing of two raft portions of this invention connected together, and with additional side portions.

FIG. 2 depicts a bottom view of a schematic drawing of two raft portions 205 and 210, shown interlocked together by way of blank 215 and tab 220. It can be appreciated that such close apposition of raft portions 205 and 210 provide little room between them for light to enter into the water. This close apposition can decrease algal contamination.

FIG. 2 also depicts "end-caps" 225 and 230 for interlocking rafts. End caps 225 and 230 have similar blank 215 and tab 220 structures as do the raft portions themselves. Once raft portions 205 and 210 are interlocked, end caps 225 and 230 can hold the raft portions in close apposition, further decreasing the likelihood of light entering the water in the pond, and thereby decreasing algal contamination. Alternatively, the rafts depicted in FIG. 1A and FIG. 1B can be used at either end of a row of rafts, can be manufactured without the blanks 120 and tabs 115 on one side of the raft such that "end-caps" are not needed along the walls of a tank.

Example 2: Plant Holes and Thermal Chimneys

Figure 3A:
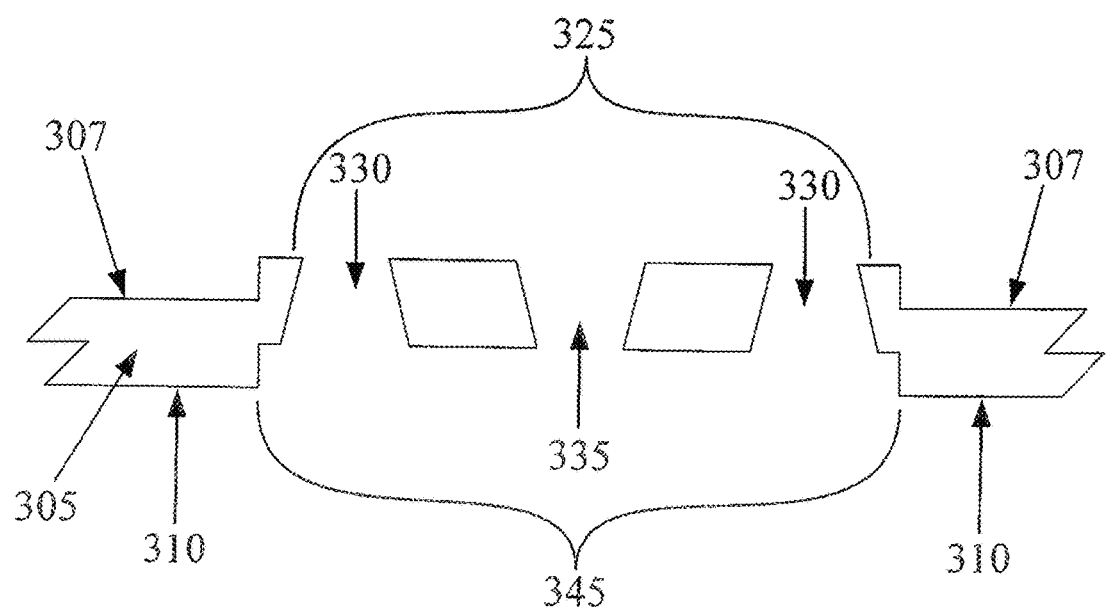
FIG. 3A depicts a diagonal side view of a raft portion of this invention showing an air trap, a plant hole, and two thermal chimneys.

FIG. 3A depicts a diagonal side view of a raft portion 300 of this invention. The upper surface 307 is the side usually exposed to the atmosphere. The lower surface 310 is generally exposed to the water in the pond. Raised area 325 and recessed area 345 are shown. The holes 330 are depicted as smaller (e.g., ¼") than plant hole 335.

FIG. 3A also depicts a plant hole 335 having a dimension at the top being wider than the dimension at the bottom. Such configuration can retain the plant plug in place, and reduces the likelihood that the plant will fall down into the water and be lost.

FIG. 3A also depicts two thermal chimneys 330, which are shown having dimensions wider at the bottom end than the top ends. Such a configuration will permit the bubbles to ascend through the raft and into the atmosphere above the raft.

When placed on top of the water in the pond, raised area 325 elevates the plant above the remainder of top surface 307. When in use, recessed area 345 provides an "air trap" so bubbles produced by the aeration mechanism (not shown) can congregate. Once bubbles congregate in recessed area 345, they can ascend thermal chimney 330, through the raft and to the upper surface 307 of the raft. This process provides for heat to be transferred from the pond to the atmosphere.

Figure 3B:
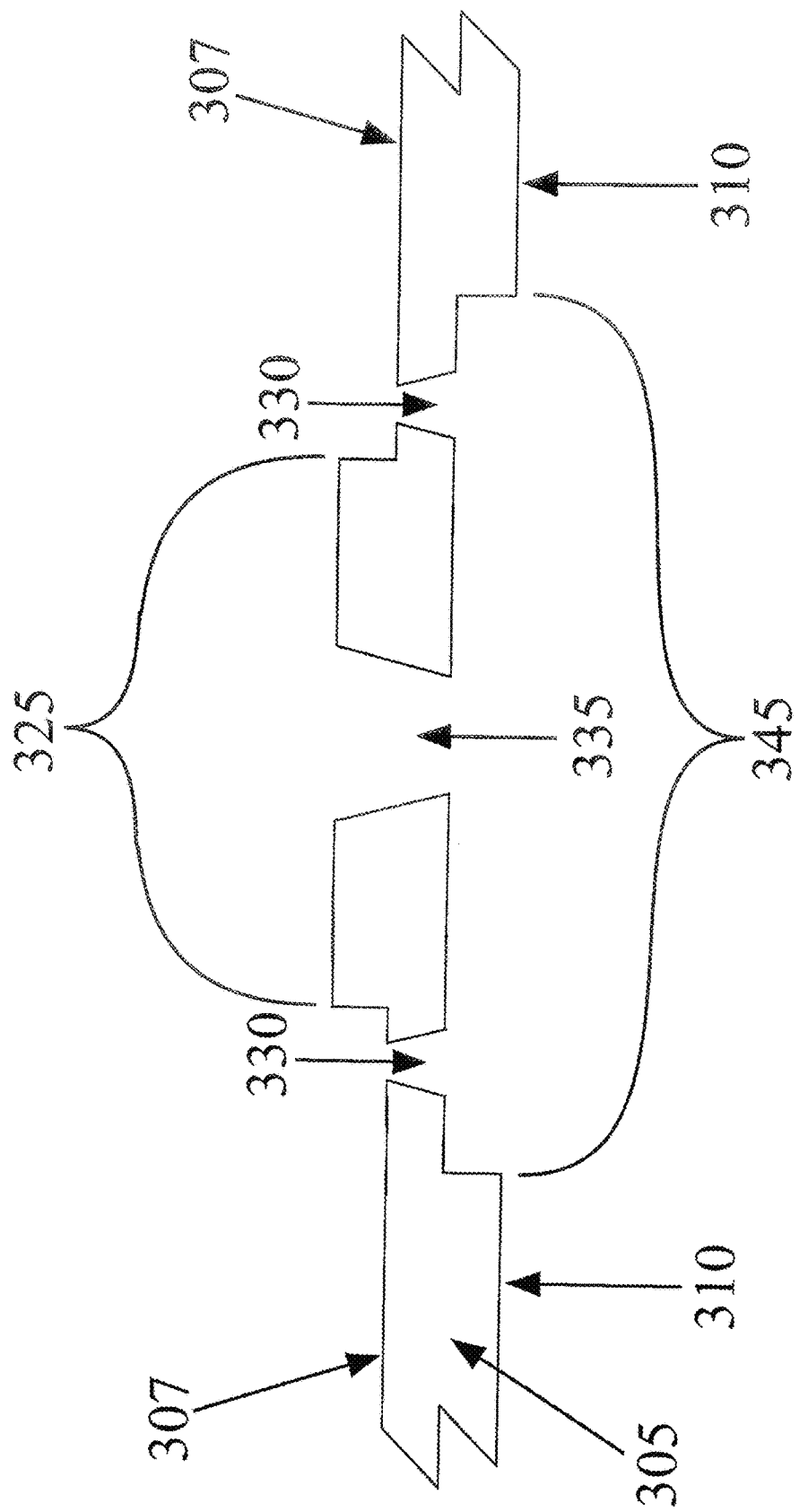
FIG. 3B depicts a diagonal side view of a raft portion of this invention showing an alternative configuration of air trap, plant hole, and two thermal chimneys.

FIG. 3B depicts an alternative configuration of a portion of a raft segment where two thermal chimneys 330 are show having smaller diameter than plant hole 335, and where thermal chimneys 330 are located laterally from the raised portion 325 of the raft segment.

Example 3: Control Module

Figure 6:
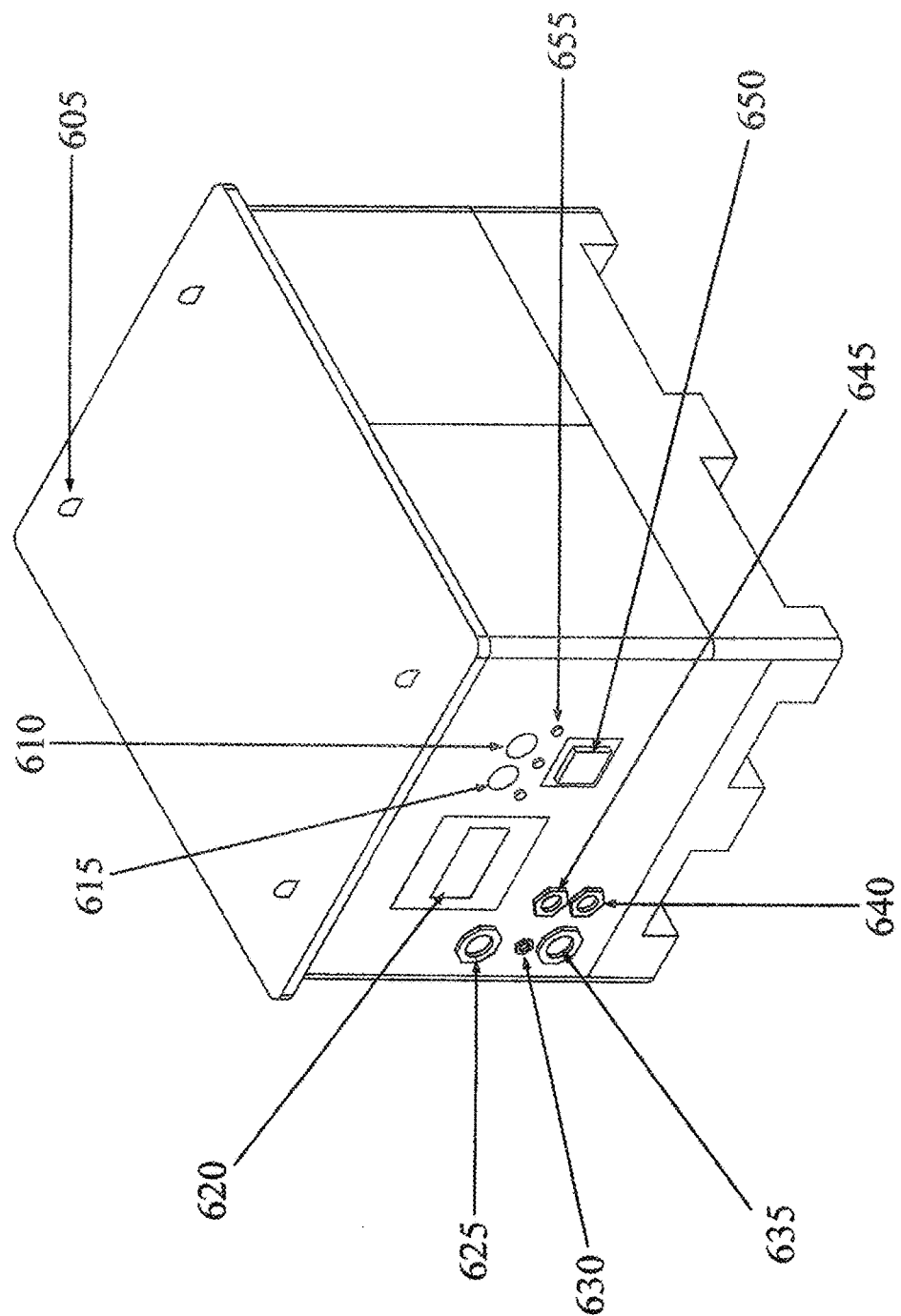
FIG. 6 depicts a view of a control module of this invention.

FIGS. 6-9 depict a Control Module of this invention. FIG. 6 depicts a view of a Control Module 600, showing outer panels, with tabs 605 to affix the top panel to a frame of the Control Module, and having water pressure gauge 610 for measuring water pressure before filtration, water pressure gauge 615 for measuring water pressure after filtration, electrical control panel 620, tank water outlet 625, aeration system outlet 630, tank water inlet 635, outlet from fertigator 640, inlet to fertigator 645, power receptacle 650, and circuit indicator light 655.

Figure 7:
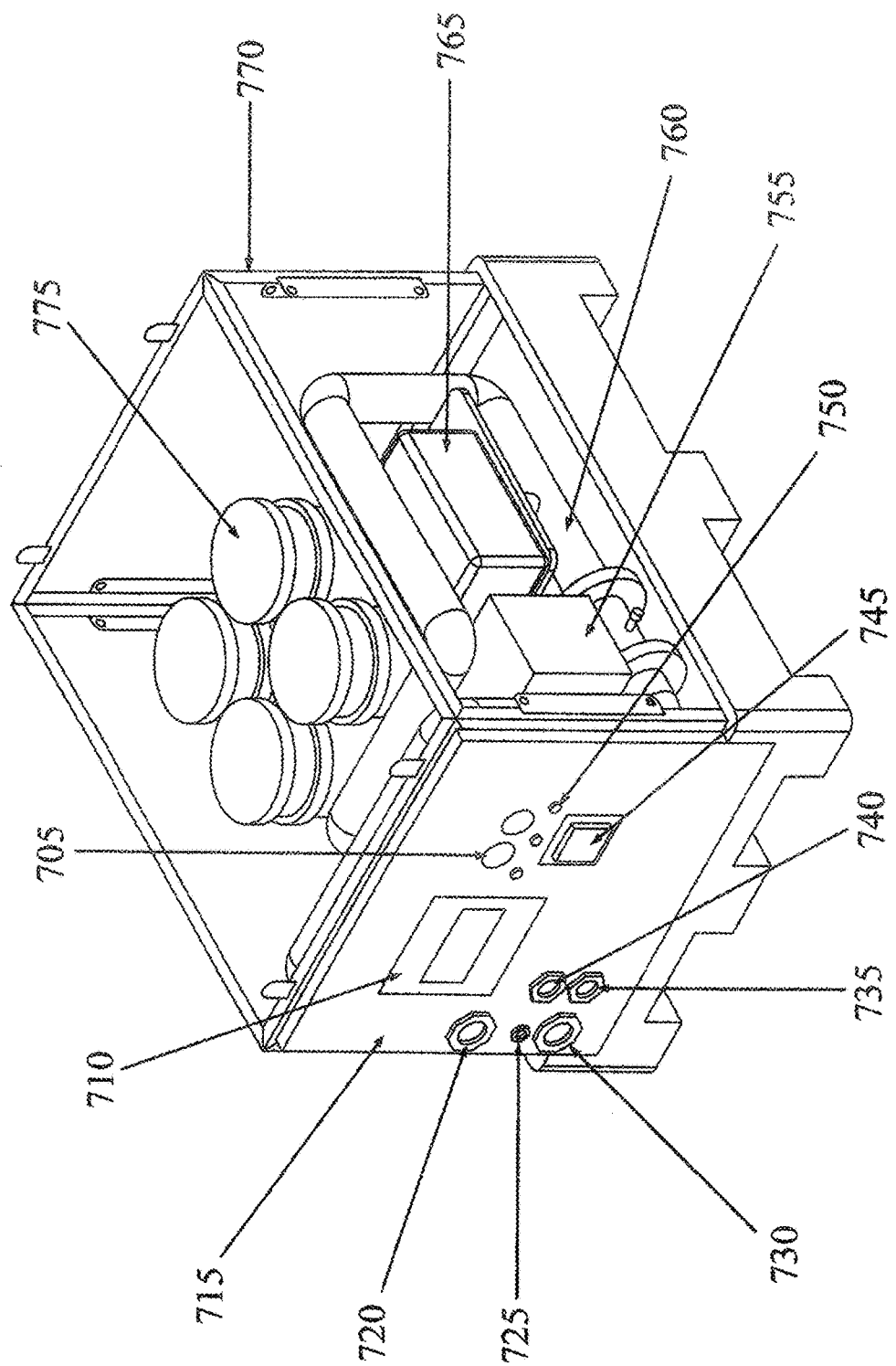
FIG. 7 depicts another view of a control module of this invention.

FIG. 7 depicts a view 700 of the interior of a Control Module as shown in FIG. 6, showing pressure gauge 705, electrical control panel 710, permanent bulkhead wall 715, tank water outlet 720, aeration system outlet 725, tank water inlet 730, outlet to fertigator 735, inlet from fertigator 740, power receptacle 745, circuit indicator light 750, ultraviolet (UV) control box 755, UV sterilizer 760, aeration compressor 765, internal aluminum structure 770, and four filters 775.

Figure 8:
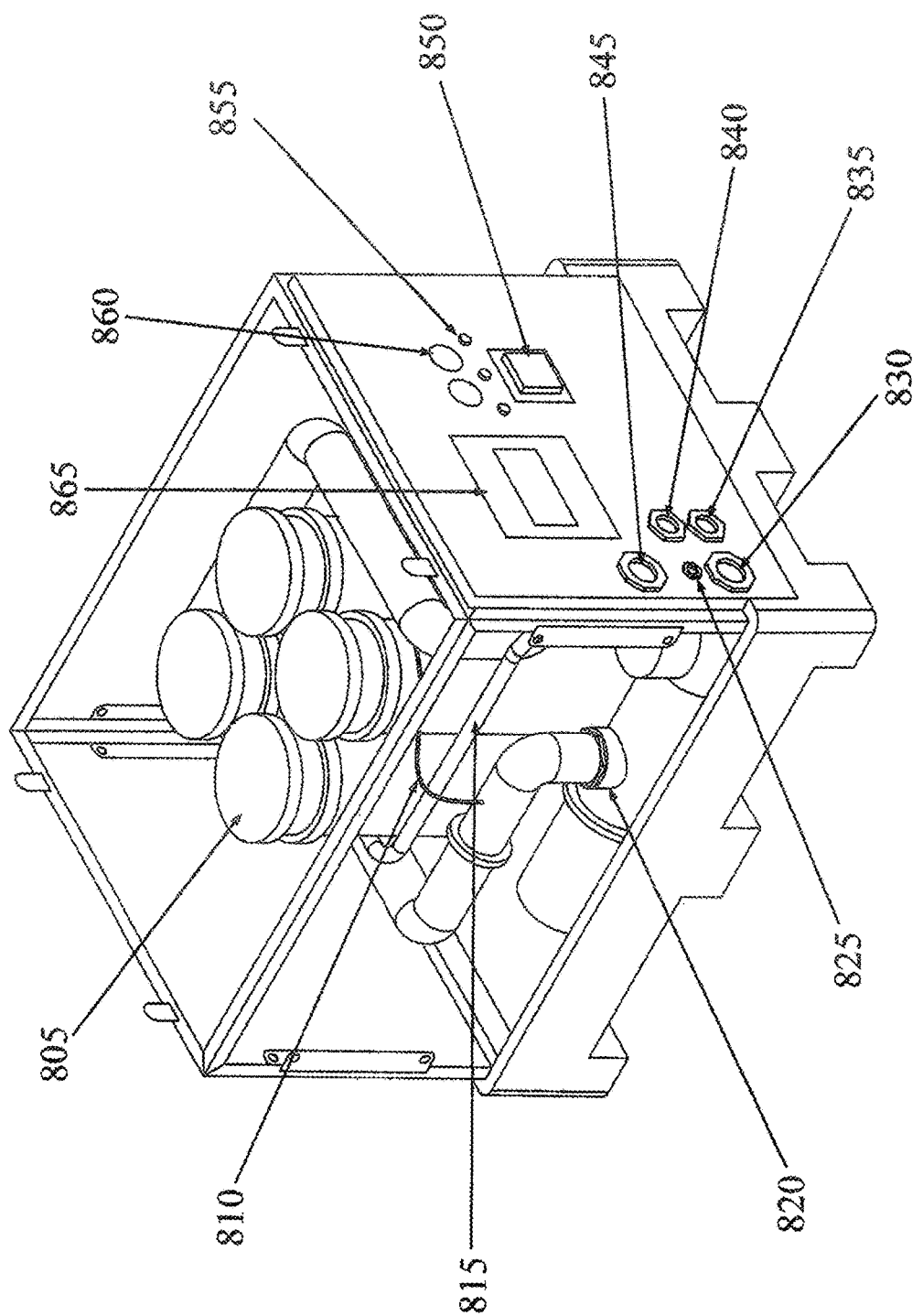
FIG. 8 depicts a further view of a control module of this invention.

FIG. 8 depicts a view 800 of the interior of a Control Module as depicted in FIGS. 6 and 7, showing four filters 805, pressure gauge hose 810, aeration hose 815, pump 820, aeration system outlet 825, tank water inlet 830, outlet to fertigator 835, inlet from fertigator 840, tank water outlet 845, power receptacle 850, circuit indicator light 855, pressure gauge 860, and electrical control panel 865.

FIG. 9 depicts a view 900 of a Control Module as depicted in FIGS. 6, 7 and 8, showing UV sterilizer control box 905, UV sterilizer 910, aeration compressor 915, and four filters 920.

Advantages of the Invention

The improved hydroponic systems described can increase plant growth rate, reduce losses, increase thermal efficiency in controlled-environment greenhouses and thereby improve yield, thereby increasing efficiency and decreasing the overall cost of hydroponic agriculture.

REFERENCES

All references cited herein, including those listed below, are incorporated herein by reference, as if separately so incorporated.

U.S. Pat. No. 4,299,054 for "Hydroponic assembly and wafer for use therein."

U.S. Pat. No. 4,355,484 for "Hydroponic tray and method of manufacture.

U.S. Pat. No. 4,382,348 for "Soilless plant growing device."

U.S. Pat. No. 4,513,533 for "Method and apparatus for hydroponic farming."

U.S. Pat. No. 4,607,454 for "Method of hydroponically growing plant sprouts and apparatus therefor."

What is claimed is:

1. A raft for hydroponics comprising:
a plurality of opaque raft segments, each segment comprising a plurality of plant holes therethrough, at least one of said plant holes having a narrower bottom dimension than a top dimension, said raft segments reversibly attached together to form a raft to completely cover the surface of a pond, at least one of said segments having a plurality of thermal chimneys arrayed diagonally surrounding a plant hole, at least one of said thermal chimneys having a wider bottom dimension than a top dimension: and
one or more attachment devices to reversibly secure a raft segment to an adjacent raft segment with no gaps between them.

2. The raft of claim 1 further comprising one or more sensors.

3. The raft of claim 1, further comprising a sensor selected from the group consisting of a temperature sensor, an oxygen sensor, a carbon dioxide sensor, an electrical conductivity sensor, a particulate sensor, pathogen sensor, nutrient ion sensor, and a pH sensor.

4. The raft of claim 3, further comprising at least one nano sensor and a wireless transmitter.

5. The raft of claim 1, further comprising a transmitter having a unique Internet Protocol (IP) address such that the raft can be identified and located.

6. A system for hydroponics, comprising:
a plurality of opaque raft segments, each segment comprising a plurality of plant holes therethrough, at least one of said plant holes having a narrower bottom dimension than a top dimension, said raft segments reversibly attached together to form a raft to completely cover the surface of a pond, at least one of said segments having a plurality of thermal chimneys arrayed diagonally surrounding a plant hole, at least one of said thermal chimneys having a wider bottom dimension than a top dimension;
one or more attachment devices to reversibly secure a raft segment to an adjacent raft segment with no gaps between them; a source of aeration bubbles;
one or more environmental sensors, each of said sensors to measure an environmental variable of the environment of said raft; and
a platform control system to:
  a) store or transmit to a remote location information captured by said one or more environmental sensors; and
  b) compare said information with previously stored benchmark data; and
  c) identify discrepancies between said information and said benchmark data; and
  d) transmit one or more signals to a solenoid, and actuator, or other controlling device to adjust the environment to bring it into benchmark tolerances.

7. The system of claim 6 further comprising a control module.

8. A method for hydroponic culture, comprising the steps:
providing a raft comprising a plurality of opaque raft segments, each segment comprising a plurality of plant holes therethrough, at least one of said plant holes having a narrower bottom dimension than a top dimension, at least one of said segments having a plurality of thermal chimneys arrayed diagonally surrounding a plant hole, at least one of said thermal chimneys having a wider bottom dimension than a top dimension;
providing one or more attachment devices to reversibly secure a raft segment to an adjacent raft segment;
placing one or more plant plugs in one or more of said plant holes;
placing said raft segments on the surface of a tank or pond containing water;
connecting said raft segments together to form a raft completely covering the surface of said water with no gaps between them;
providing a source of aeration bubbles in said tank or pond;
measuring one or more environmental variables using one or more sensors; and
if the level of at least one of said environmental variables is outside a desired range, using an actuator to adjust the level of said environmental variable to return said variable to within a desired benchmark range.

9. The method of claim 8, further comprising the steps:
causing one or more sensors to transmit a measured value of an environmental variable using a wireless communication system to a remote location having a database containing a desired value of said environmental variable, said remote location having a processor associated with said database;
causing said processor to compare said measured value of said environmental variable with the desired value of said environmental variable, and
causing said processor to transmit instructions to said actuator to adjust the value of said environmental variable to within the desired range.

10. The raft of claim 1, further comprising an ion sensor to measure nitrogen, calcium, or potassium.

11. The system of claim 6, said one or more environmental sensors selected from the group consisting of a temperature sensor, an oxygen sensor, a carbon dioxide sensor, an electrical conductivity sensor, a particulate sensor, pathogen sensor, nutrient ion sensor, and a pH sensor.

12. The raft of claim 1, said thermal chimney having a tapered shape being circular, oval, or polygonal cross-section.

13. The raft of claim 1, said thermal chimney having a bottom end having a diameter of about ¾ inch, and a top end having a diameter of about ¼ inch.

* * * * *